United States Patent
Froh et al.

(10) Patent No.: US 10,855,767 B1
(45) Date of Patent: Dec. 1, 2020

(54) DISTRIBUTION OF BATCH DATA TO SHARDED READERS

(71) Applicant: Amazon Technologies, Inc., Seattle, WA (US)

(72) Inventors: Michael Froh, Redmond, WA (US); Christopher Nathan Dowling, Seattle, WA (US); Shaikat Mahmud Islam, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 15/912,188

(22) Filed: Mar. 5, 2018

(51) Int. Cl.
*H04L 29/08* (2006.01)
*G06F 7/08* (2006.01)
*H04L 12/743* (2013.01)

(52) U.S. Cl.
CPC .......... *H04L 67/1097* (2013.01); *G06F 7/08* (2013.01); *H04L 45/7453* (2013.01)

(58) Field of Classification Search
CPC .......... G06F 16/278; G06F 16/24554; G06F 16/252; G06F 16/182; G06F 9/5061; G06F 16/2255; G06F 16/244; G06F 16/24568; G06F 16/2471; G06F 2201/86; G06F 2206/1012; G06F 3/061; G06F 3/0644; G06F 5/065; G06F 9/505; G06F 9/5077; H04L 67/02; H04L 9/0643
USPC .................. 707/736, 803, 737, 741; 709/219
See application file for complete search history.

(56) References Cited

U.S. PATENT DOCUMENTS

| | | | | |
|---|---|---|---|---|
| 2006/0184565 | A1* | 8/2006 | Nishikawa | G06F 3/064 |
| 2007/0038658 | A1* | 2/2007 | Ghosh | G06F 16/24532 |
| 2010/0169274 | A1* | 7/2010 | Kulkarni | G06F 16/2228 |
| | | | | 707/609 |
| 2011/0022816 | A1* | 1/2011 | Swett | G06F 12/02 |
| | | | | 711/173 |
| 2012/0066207 | A1* | 3/2012 | Ochi | G06F 16/2455 |
| | | | | 707/714 |
| 2012/0330954 | A1* | 12/2012 | Sivasubramanian | H04L 67/02 |
| | | | | 707/737 |

(Continued)

OTHER PUBLICATIONS

Daniel Lemire, A fast alternative to the modulo reduction, 2016, pp. 1-16 (Year: 2016).*

*Primary Examiner* — Tonia L Dollinger
*Assistant Examiner* — Linh T. Nguyen
(74) *Attorney, Agent, or Firm* — Lee & Hayes, P.C.

(57) ABSTRACT

A system may route incoming data to different data shards using a scalable system architecture. The system may include a data ingestion service, such as a naming service that may input data for you by the system. This data may be routed to specific applications, which may be associated with different shards of the data. The system may decouple data ingestion components from application components to enable adding additional capacity at either end of the system, or anywhere between, to accommodate increases in demand and/or to increase throughput. For example, the system may be modified to add additional data ingestion components without modifying the number of applications components to increase throughput of data ingestion. Similarly, the system may be modified to add application components without modifying the number of data ingestion components to increase throughput of data analysis, for example.

20 Claims, 11 Drawing Sheets

(56) References Cited

U.S. PATENT DOCUMENTS

| | | | | |
|---|---|---|---|---|
| 2013/0297788 A1* | 11/2013 | Itoh | ............... | H04L 43/0876 |
| | | | | 709/224 |
| 2014/0297651 A1* | 10/2014 | Shadmon | ............ | G06F 16/2228 |
| | | | | 707/741 |
| 2015/0134796 A1* | 5/2015 | Theimer | ............... | G06F 16/258 |
| | | | | 709/223 |
| 2015/0378635 A1* | 12/2015 | Skjolsvold | ............ | G06F 3/0626 |
| | | | | 711/114 |
| 2016/0070721 A1* | 3/2016 | Menendez | ......... | G06F 16/1858 |
| | | | | 707/823 |
| 2016/0092517 A1* | 3/2016 | Viel | ................ | G06F 16/24568 |
| | | | | 707/770 |
| 2016/0148232 A1* | 5/2016 | Besehanic | .......... | G06Q 30/0204 |
| | | | | 705/7.33 |
| 2016/0306854 A1* | 10/2016 | Hegde | ................... | G06F 16/22 |
| 2017/0123942 A1* | 5/2017 | Borah | ................ | G06F 11/3409 |
| 2017/0300490 A1* | 10/2017 | Kachemir | ................ | G06F 7/24 |
| 2017/0316081 A1* | 11/2017 | Kafai | .................. | G06F 16/285 |
| 2018/0196867 A1* | 7/2018 | Wiesmaier | ............ | G06F 9/4881 |
| 2018/0203942 A1* | 7/2018 | Liu | ..................... | G06F 16/9014 |
| 2018/0276259 A1* | 9/2018 | Bowman | ............ | G06F 16/2246 |
| 2018/0300350 A1* | 10/2018 | Mainali | .................. | G06F 17/30 |
| 2018/0300385 A1* | 10/2018 | Merriman | ............ | G06F 16/278 |

\* cited by examiner

DISTRIBUTION OF BATCH DATA TO SHARDED READERS

BACKGROUND

Some services receive an increasing number of requests over time. In order to fulfill these requests to a predetermined service level agreement, systems may undergo upgrades from time to time. However, certain types of systems are not easily expanded or scaled, such as systems that require sharing of state information or synchronization with other machines and/or systems with other types of temporal constraints or other design constraints.

Data shards are typically horizontal partitions of data, such as rows of data (e.g., records of data). Some systems analyze data to determine when and where to allocate data to create different data shards. When allocating data, system designers often need to balance a frequency of sending data to the data shards with a cost associated with sending the data. Frequent updates to data shards may provide timely information, but may include a high resource cost whereas larger batch updates may include lower resource costs, but may result in less timely and possibly stale or outdated information.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
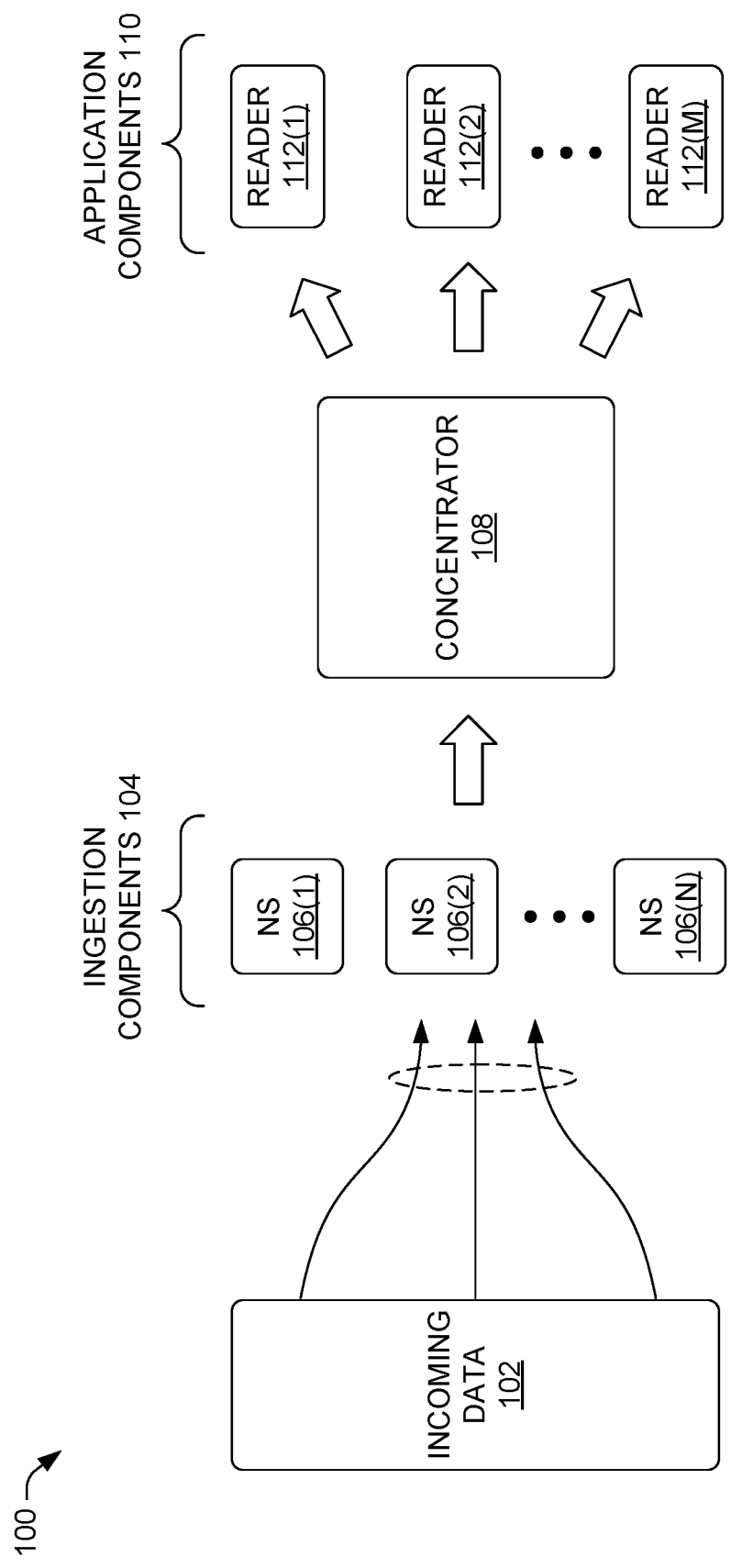
FIG. 1 is a block diagram of an illustrative system providing distribution of batch data to sharded readers.

This disclosure is directed to transmitting data to different data shards using a scalable system architecture. The term "shard" in this disclosure may refer to sharding of pipeline or streamed data, which may provide different records of data to different endpoints (e.g., applications, readers, etc.). An illustrative system may include a data ingestion service, such as a naming service that may input data for you by the system. This data may be routed to specific applications, which may be associated with different shards of the data. The system may decouple data ingestion components from application components to enable adding additional capacity at either end of the system, or anywhere between, to accommodate increases in demand and/or to increase throughput. For example, the system may be modified to add additional data ingestion components without modifying the number of applications components to increase throughput of data ingestion. Similarly, the system may be modified to add application components without modifying the number of data ingestion components to increase throughput of data analysis, for example.

In some embodiments, the system may include one or more concentrator components which may receive a sorted, but undifferentiated, batch of data from one of the data ingestion components. A concentrator may combine the batch of data with other similarly sorted batches of data to create a group of sorted and differentiated data (e.g., grouped batch data). The data may be sorted by a hash of a metric identifier, which may be determined by the data ingestion component, such as a naming service. The concentrator may include predetermined partitions that, combined, span the range of possible hash keys associated with records of data in the grouped batch data. Each sub-partition may define a key space having an equal range of hash key values. For example, when the hash key is a 32 bit value, each key space may span $2^{29}$ when eight sub-partitions are used by the concentrator. However, in practice, many more sub-partitions may be used, such as $2^{10}$ (1024) or more sub-partitions depending on design requirements and/or other system specifications. For example, when the hash key is a 32 bit value, each key space may span $2^{22}$ when 1024 sub-partitions are used by the concentrator. Each key space may be associated with a particular application. Thus, a shard of data (i.e., records in a particular key space) may be sent by the concentrator to a particular application for further processing.

In various embodiments, the conveyance of data may be performed by using data storage devices to store batches of data and using data streams to send pointers to other devices, where the pointers allow access of the batches of data from the data storage devices. By using both data storage devices and data streams, the system may leverage advantages of each data resource. For example, data storage devices may be optimized to store large amounts of data while data stream may be optimized to quickly dissemination information in an ordered and a timely manner, buy may have limitations on how much information can be efficiently transported, thus a rational for transporting pointers to data stored in the data storage devices.

As discussed above, the system may accommodate scalability by decoupling dependencies between frontend devices (e.g., naming services, ingestion components) and endpoint devices (e.g., application components, application shards, etc.). Further, one or more concentrators may be used to route the data to a corresponding application by leveraging hash keys grouped by different key spaces designated by a concentrator. Like the frontend devices and endpoint devices, the concentrator(s) may lack dependencies with other devices, and thus may be expanded and scaled to increase system throughput, as desired.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a block diagram of an illustrative system 100 providing distribution of batch data to sharded readers. The system 100 may receive incoming data 102, which may be received from one or more computing devices. The incoming data 102 may be event data, user input data, user interaction data, and/or other types of information, which may be routed to different shards for further processing. As an example, the incoming data 102 may include search terms or other data including metric names which may be used to create hash keys.

The incoming data 102 can relate to practically any type of data. In some examples, the incoming data 102 may pertain to clickstream data, such as data that indicates when customers select an element of interest on a website or other event data. As another example, the input data may be generated by devices, such as Internet of Things (IoT) device(s) that provide a continuous flow of IoT data to the system 100 as the incoming data 102. Other examples of incoming data streams 102 include, without limitation, stock trading data, audience tracking data, order placement data, and the like.

The system 100 may include ingestion components 104. As shown in FIG. 1, the ingestion components may be implemented as one or more naming services 106(1), 106(2), . . . 106(N), or collectively as 106. The naming services 106 may receive the incoming data 102 and determine metric name information. The naming services 106 may generate a hash key for the metric name or for other information received. The naming services 106 may then generate a sorted and undifferentiated batch of data, which may ultimately be conveyed to a concentrator component 108 for further processing.

The naming services 106 may convey various batches of data to the concentrator 108. As discussed below, multiple concentrators may be deployed based on processing and throughput requirements and/or other design considerations of the system. The concentrator 108 may create grouped batch data that is sorted and differentiated by obtaining batches of data processed by different naming services. The concentrator 108 may sort the presorted batches of data quickly and efficiently since the incoming data is already sorted and includes hash keys based on metric names associated with data records. Undistinguished batches sent by the naming services 106 may be sorted according to shard hash key, allowing the concentrator 108 to merge M batches with a total of N elements in N log(M) time.

The concentrator 108 may include predetermined sub-partitions, which may define key spaces for ranges of hash key values for routing to particular application components 110. For example, the concentrator 108 may include $2^n$ partitions. As an example, n=3, and thus eight equal partitions may be used by the concentrator 108 in this example. Each partition may be associated with a key space, which may be a range of hash key values, where the range is of equal length for each sub-partition. Thus, each key space may include a same number or range of values (e.g., $2^{29}$ in this example). When the hash key includes a lower bit value (e.g., not a 32 bit value, the value may be converted to a 32 bit value such by adding zeros in right most locations, such that the resulting hash values approximately span the full 32 bit range.

The concentrator 108 may route records for different key spaces to different application components 110 for further processing. The application components 110 may include readers 112(1), 112(2), . . . 112(M), collectively 112. Since each key space may be associated with a different shard of data, the resulting records may be efficiently routed to an appropriate application component, or application shard for further processing.

As an example, the ingested data may include search terms, which are used to create hash keys by a naming service. The hashed search terms are then sorted and processed as a batch of data. This batch of data is then combined with other batches of data as sorted and grouped batch data. Records within a particular key space are then selected for transmission to a corresponding application for further processing as sharded data. In this example, the sharded data includes a subset of search terms. By specifying a proper size for the number of sub-partitions to apply to the hash keys of the grouped batch data, the system may quickly and efficiently direct/route sharded data (e.g., data records of search terms) to a proper application for further processing. Further, selection of a proper hashing function may cause desired routing of the data based on resulting hash keys of corresponding records, which are determined to be within a key space (e.g., range of hash key values such as 0 to $2^{29}$, etc.).

The ingestion components 104 may be computing devices and may have no fixed relationship with one another (e.g., the naming services 106 may operate independent from one another). Similarly, the application components 110 may have no fixed relationship with one another (e.g., the readers 112 may operate independent from one another). In addition, the ingestion components 104 are decoupled from the application components 110 by the concentrator 108, which allows horizontal scalability of the ingestion components 106 and/or the application components 110, which may enable increasing data throughput by the system 100. The system also enable adding redundancy without need to coordinate between the different components, such as by sharing state information or synchronizing components with other components.

The system 100 may represent a computing network, with various networked-computing systems and devices, configured to provide computing resources (sometimes referred to simply as "resources") on a permanent or an as-needed basis. It is to be appreciated that the system 100 may be part of a larger computing network/system that is configured to provide additional types of network-based services and/or provide additional types of computing resources. For example, the system 100 may be part of a system that also provides, without limitations, data processing resources, data storage resources, virtual machine ("VM") instances, networking resources, data communication resources, network services, and/or other types of computing resources and associated network-based services.

Figure 2:
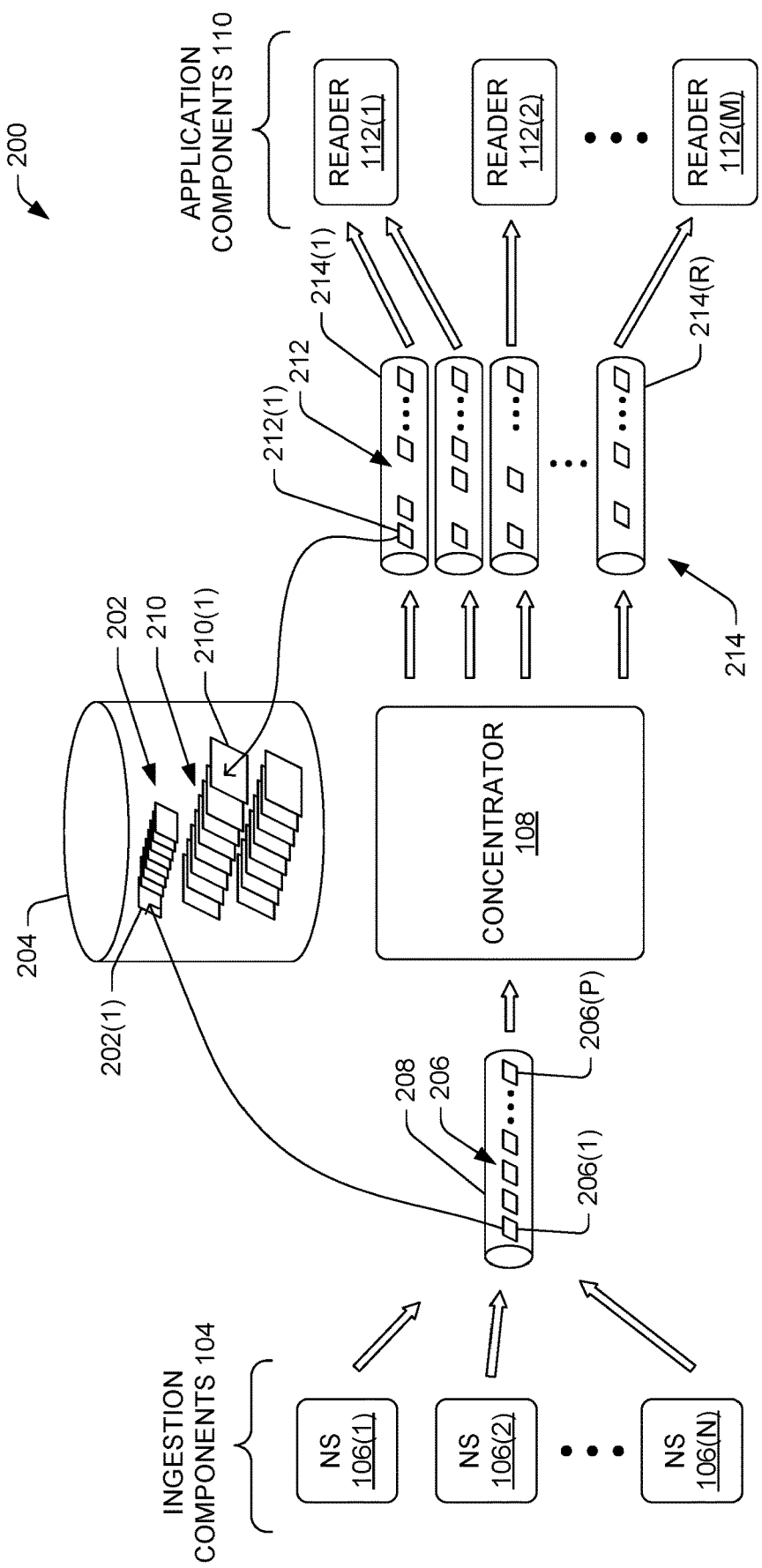
FIG. 2 is a block diagram of an illustrative system providing distribution of batch data to sharded readers and including data streaming services and data storage services to convey data between at least some components of the system.

FIG. 2 is a block diagram of an illustrative system 200 providing distribution of batch data to sharded readers and including data streaming services and data storage services to convey data between at least some components of the system. The system 200 may include at least some components that are similar or the same as components included in the system 100 shown in FIG. 1.

The system 200 may include the naming services 108, which ingest data for use by the concentrator 108. The a naming service, such as the naming service 106(1) may identify metric names and/or other desired data and create a hash key for a record. The naming service 106(1) may store the record with other records identified by the naming service 106(1) in a undifferentiated sorted batch of data. The naming services 106(1) may store the undifferentiated sorted batch of data 202(1) in a data storage device 204, which may be optimized to store large amounts of data. An example of the data storage device is Amazon AWS S3 data storage service. Meanwhile, the naming service 106(1) may create a pointer 206(1) that can be used to identify and retrieve the batch of data 202(1) from the data storage device 204. The pointer 206(1) may be a key or anther address identifier associated with the data storage device 204 and/or the batch of data 202(1). Ultimately, the data storage device 204 may store many batches of data 202(1)-(P) created by the different naming services 106, which may operate in a similar manner as the naming service 106(1), but may identify different metric names or different data than the naming service 106(1). The many batches of data 202(1)-(P) may be associated with corresponding pointers 206(1)-(P) similar to the relationship between the pointer 206(1) and the batch of data 202(1). The pointers (collectively pointers 206) may be referred to as "first pointers."

Each naming service 106(1)-(N) may perform these operations separately or possibly with some collaboration, to create the many batches of data 202 (sorted, undifferentiated) for storage in the data storage device 204 and associated with pointers 206(1)-(P) that correspond to the many batches of data 202(1)-(P).

The naming service 106(1) may send the pointer 206(1) to a streaming service 208 for conveyance to the concentrator 108. The streaming service may be optimized to efficiently deliver the pointers to the concentrator 108 via streaming data. An example of the streaming service is Amazon Kinesis data streams and streaming service. The data streams may send the pointers in a first in, first out pipeline for receipt by the concentrator 108, which may process the pointers 206.

The concentrator 108 may ultimately receive the pointers 206, access corresponding batches of data from the many batches of data 202, and create grouped batches of data 210, which are differentiated and sorted. The grouped batches of data 210 may be stored in a data storage service, such as the data storage service 204 or another different data storage service. Since the batches of data 202 are already sorted and include hash keys, the concentrator 108 may efficiently assemble the grouped batches of data 210. The concentrator 108 sort or otherwise process the records using predefined sub-partitions, which sort the records in a grouped batch of data 210(1) into different shards of records which are associated with pointers 212, also referred to as "second pointers" or "shard pointers". For example, records in a first grouped batch of data 210(1) may be sorted or otherwise grouped by the sub-partitions into a plurality of different partitions based on a key space range that uses the hash key value of the records. Ultimately, each sub-partition (or key space) creates a pointer, such as a pointer 212(1), for the records in the key space, which is then sent to a corresponding shard data stream of a plurality of shard data streams 214. For example, the pointer 212(1) may be sent to a first shard data stream 214(1) that corresponds to the sub-partition or key space associated with the records referenced by the pointer 212(1). Each key space or sub-partition may be mapped to respective shard data streams 214. The shard data streams 214 may be similar to the data stream 208, but may be directed to convey the second pointers 212 to the readers 112(1)-(M) based on a predefined mapping. For example, a shard data stream 214(1) and a shard data stream 214(2) may convey second pointers to the reader 112(1) while a shard data stream 214(R) may convey second pointers to the reader 112(M). A detailed discussion of the processing by the concentrator 108 is provided below with reference to FIG. 3.

To accommodate additional throughput in the system 200, additional naming services 106 may be added to create additional batches of data and corresponding pointers for conveyance to the concentrator 108 (or another concentrator), via the data stream 208. Similarly, additional readers 112 may be added to read the second pointers 212, and retrieve the corresponding records associated with the pointers. In some embodiments, the second pointers may point to locations within the grouped batches of data 210, while in various embodiments, the grouped batches of data may be associated with sub-partitions (e.g., key space of records), and not include records of other sub-partitions or key spaces. Likewise, additional shard data streams 214 may be used or a mapping of the sub-partitions to shard data streams 214 and/or a mapping of the shard data streams 214 to the readers 112 may be updated to accommodate increased throughput of data by the system 200. Examples of added capacity are discussed below with reference to FIG. 4.

Figure 3:
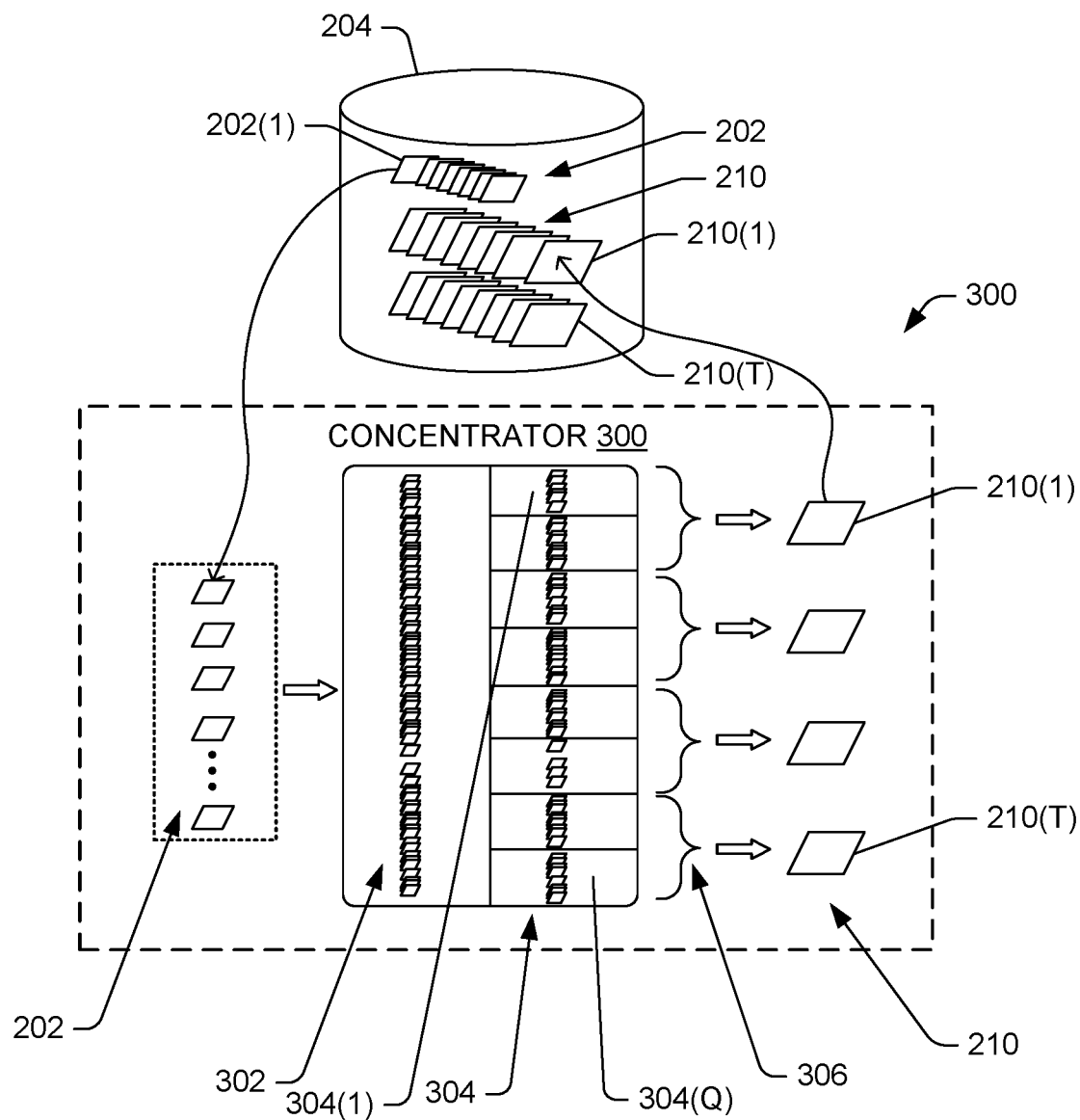
FIG. 3 is a schematic diagram of an illustrative concentrator to process incoming batches of data and outputting groups of batched data.

FIG. 3 is a schematic diagram of an illustrative concentrator 300 to process incoming batches of data and outputting groups of batched data. The concentrator 300 may be the same as or similar to the concentrator 108 described herein. As described above, the concentrator 108 receives pointers 206 to data stored in the data storage device 104. Here, the concentrator 300 may receive the pointers and then access the corresponding data, shown as the grouped batch data 206. Multiple instances of the grouped batches of data 206 may be accessed for processing by the concentrator 300. For example, the concentrator 300 may receive a collection of associated pointers, determine that the pointers are to be used for processing a same group of batched data, possibly based on the hash keys of records associated with the pointers. Next, the concentrator 300 may retrieve the corresponding batches of data 206 for further processing. The grouped batches of data 206 may be undifferentiated and sorted. By way of selection, the concentrator 300 may assemble grouped batches of data that are differentiated and sorted. The concentrator may efficiently sort the batches of data 206 since the batches of data include presorted records 302 with hash keys. As shown in FIG. 3, the records 302 may be arranged by hash key from a lowest hash key to a highest hash key (or vice versa) to create an ordered set of the hash keys. In various embodiments, the concentrator 300 may remove duplicate records or other duplicate data when processing the batches of data 202.

As discussed above, the concentrator 300 may include sub-partitions 304 used to sort or group the records 302 into different groups for assignment to different readers 212 via the shard data streams. The sub-partitions may span from a first sub-partition 304(1) to a last sub-partition 304(Q). To accommodate added capacity, the number of sub-partitions may be selected as a base-2 number ($2^N$) where the number is greater than a number of expected readers over a given period of time. For example, if a system may initially be implemented with 8 readers, but is expected to grow to 16 readers within a few years, the number of sub-partitions may be selected at 64 (i.e., $2^6$) to accommodate unexpected growth, thus effectively a grown factor of 4×. By using a base-2 number for the sub-partitions, the resulting sub-partitions can be easily mapped to shard data streams, where records from different sub-partitions may be initially assigned to a same shard data stream, and then later assigned (mapped) to different shard data streams as the system adds capacity and requires greater data throughput.

Each sub-partition 304 may include a key range for hash keys of records to be included in the respective sub-partition. As an example, if the concentrator include eight sub-partitions which evenly divide up a key range of ($2^{32}$), then, the key space ranges of the hash values may be assigned according to Table 1. In practice, the number of sub-partitions may be $2^{10}$ (1024) or greater. However, for explanation purposes, Table 1, below, shows a simple division of eight sub-partitions.

TABLE 1

| Sub-Partition | Key Value Low Bounds | Key Value Upper Bounds |
| --- | --- | --- |
| 1 | 0 | $2^{29}$ |
| 2 | $2^{29}$ | $2^{30}$ |
| 3 | $2^{30}$ | $2^{30} + 2^{29}$ |
| 4 | $2^{30} + 2^{29}$ | $2^{31}$ |
| 5 | $2^{31}$ | $2^{31} + 2^{29}$ |
| 6 | $2^{31} + 2^{29}$ | $2^{31} + 2^{30}$ |
| 7 | $2^{31} + 2^{30}$ | $2^{31} + 2^{30} + 2^{29}$ |
| 8 | $2^{31} + 2^{30} + 2^{29}$ | $2^{32}$ |

In practice, an equal number of the records 302 is unlikely to fall within each sub-partition. For example, a first sub-partition (first key space) may include many records that include hash keys within the lower and upper bounds for the respective first sub-partition (first key space), while a second sub-partition (second key space) may include fewer records that include hash keys within the lower and upper bounds for the respective second sub-partition (second key space). As discussed above, the number of sub-partitions (key spaces) is a design consideration. Thus, more or fewer sub-partitions may be used by the concentrator 300.

The records for each sub-partition may then be assigned via a map 306 or other designator to a respective shard data stream as a block of records e.g., a block of records 210(1). Multiple blocks of records may be assigned in this manner to different shard data streams, such as the block of records 210(1)-(T). In some embodiments, records from multiple sub-partitions may be to a shard data stream (as a second pointer). The second pointer may point to the particular records stored in the data storage device 204, which may include the only the particular records, or may include the grouped batch data that include other records, where the particular records are located via the second pointer. Ultimately, the shard data stream conveys the second pointer to a corresponding reader of the readers 112 shown in FIG. 2, which then processes the records as a shard of data. By selecting the hash keys and sub-partitions to align with desired shards of records, the shards of records are made accessible to a corresponding reader. To convey the records, the pointer will notify the reader about an availability of records in the data storage device which may be processed by the corresponding reader.

Figure 4:
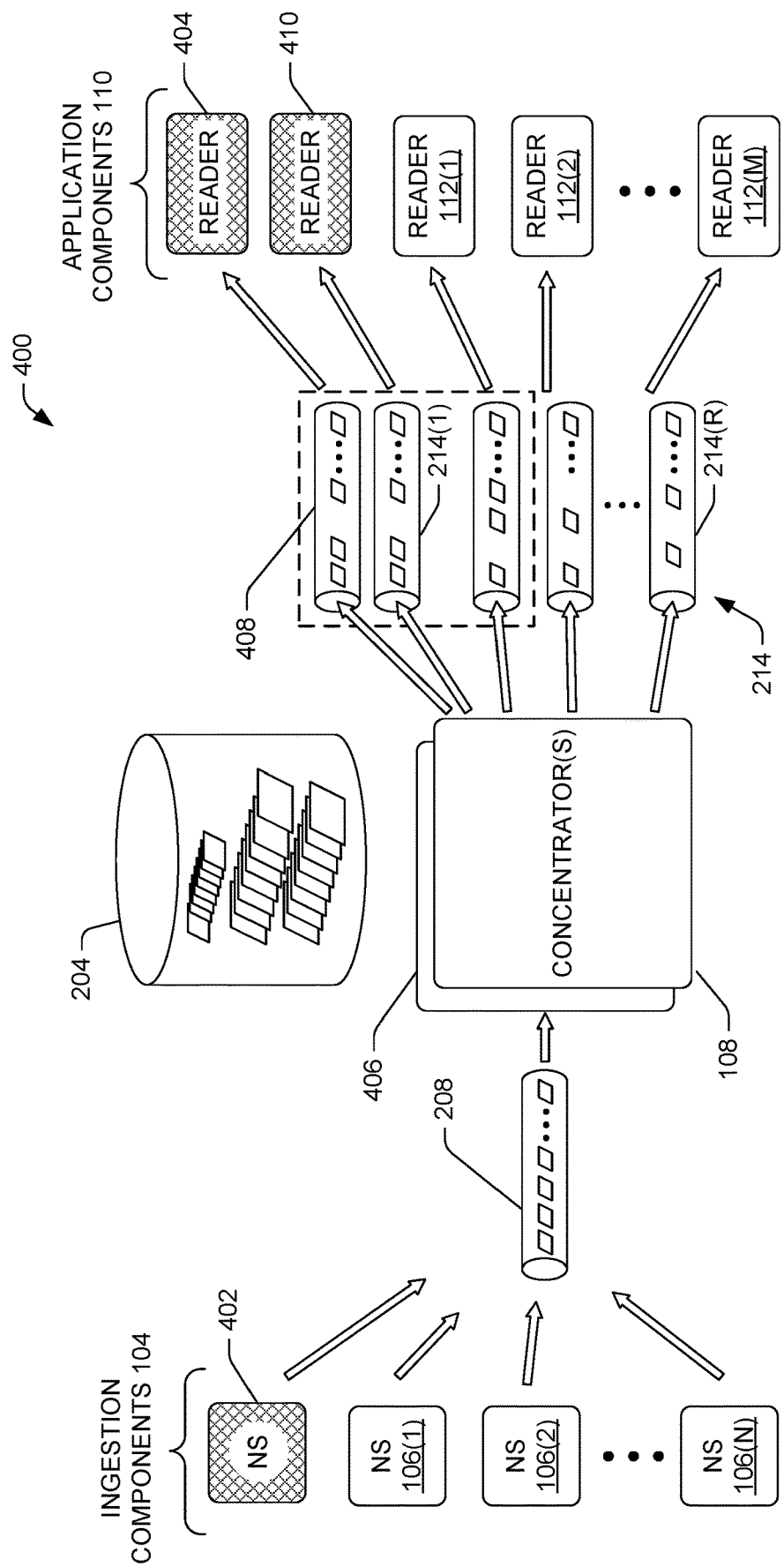
FIG. 4 is a block diagram of another illustrative system providing distribution of batch data to sharded readers, including additional components to assist with an increased ingestion of data.

FIG. 4 is a block diagram of another illustrative system 400 providing distribution of batch data to sharded readers, including additional components to assist with an increased ingestion of data. The system 400 may be similar to the system 200, but may include additional component to increase throughput of data through the system. The additional components may be at least one of a naming service 402, a reader 404, a concentrator 406, or a shard data stream 408. In some embodiments, a change in mapping of second pointers to the shard data streams, and ultimately do the readers may increase throughput or be performed to accommodate addition of components, such as more readers.

An additional naming service 402 may be added to create additional batches of data and corresponding pointers for conveyance to the concentrator 108 (or another concentrator), via the data stream 208. The added naming service 402 may identify different metric names or different data than the other naming services 106(1)-(N). However, in some embodiments, the naming service 402 may perform the same or similar operations as an existing naming service, and may cooperatively work with another naming service.

An additional reader 404 (and possibly other additional readers such as an additional reader 410) may be added to the application components 110 in addition to the readers 112(1)-(M). The additional readers 404 and 410 may read certain ones of the second pointers 212, and retrieve the corresponding records associated with certain ones of the second pointers. The addition of the additional readers 404, 410 may cause a change in the configuration or assignment of records to shard data streams to the readers. For example, when multiple shard data streams feed pointers to a same reader, the sharded data streams may later (after adding a new reader) be configured to convey pointers to different readers. As shown in FIG. 4, the first shard data stream 214(1) may be configured to convey pointers to the additional reader 410.

An additional concentrator 406 may be added to perform similar functions as the concentrator 108. For example, multiple concentrators may be deployed to obtain pointers via the data stream 208 (and/or possibly other data streams), and create the grouped batches of data described above. In some embodiments, multiple concentrators may operation in cooperation with one another. However, the concentrators may be configured to operate independent of one another, such as by processing data in different key spaces, for example. Different concentrators may provide data to different sharded data streams, or possibly to a shared or possibly overlapping set of the sharded data streams.

An additional shard data stream 208 may be added to accommodate conveying a pointer to a different or new reader or to an existing reader. As discussed above, a mapping change of a mapping of the sub-partitions to shard data streams and/or a mapping of the shard data streams 214 to the readers may be updated to accommodate increased throughput of data by the system. For example, when multiple sub-partitions cause pointers of records to be directed to a same shard data stream, those sub-partitions may be later configured to send pointers to different shard data streams, such as the additional shard data stream 208. The additional shard data stream 208 may convey pointers to the new reader 404, for example, which may increase throughput of the system.

Since the systems described herein do not generally share state information nor generally require any type of synchronization, any number of additional components may be added as long as the expansion capacity of the sub-partitions in not exceeded. Thus, the system cannot easily accommodate more sharded readers than sub-partitions.

Figure 5:
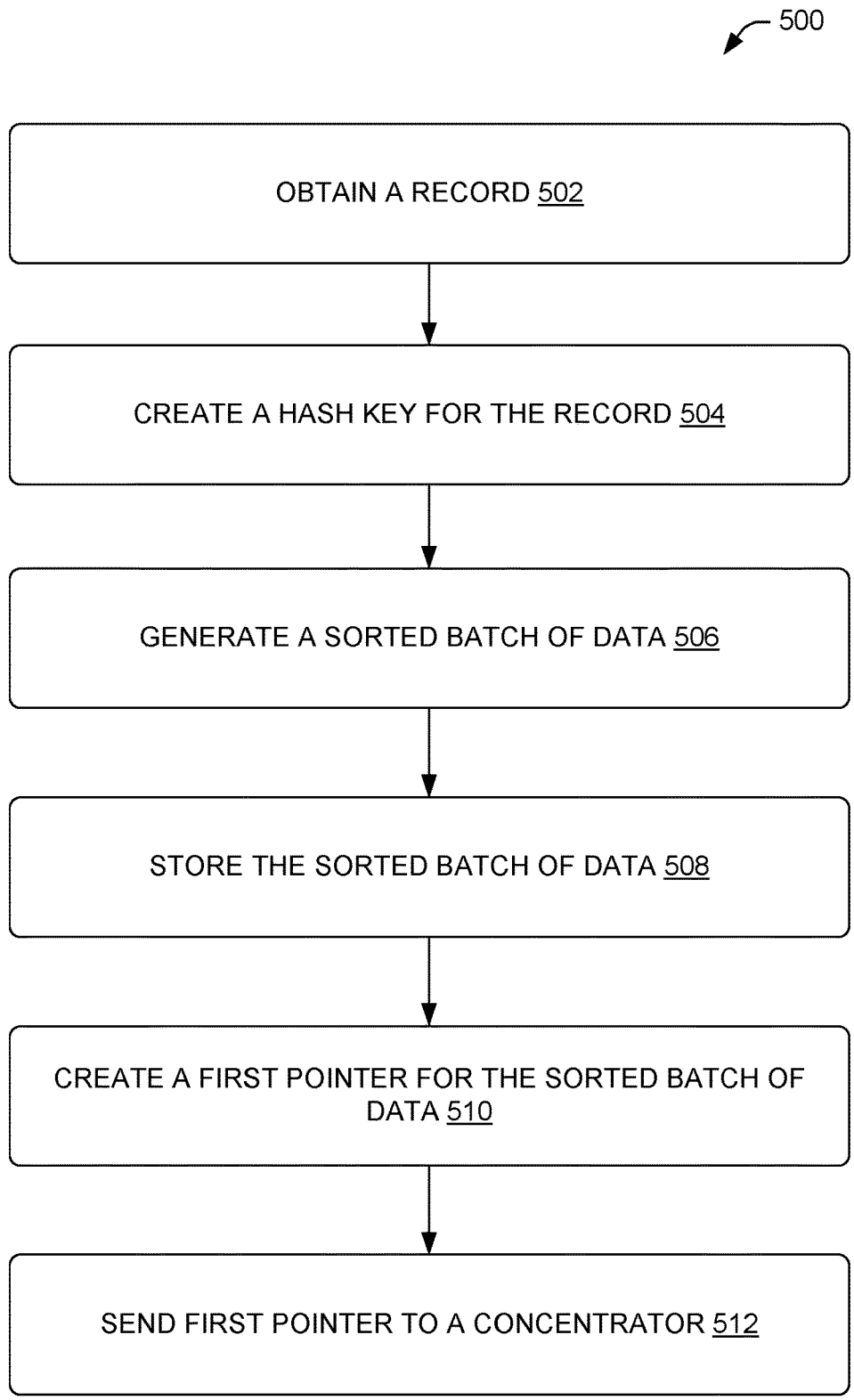
FIG. 5 is a flow diagram of an illustrative process performed by a naming service to process incoming data.
Figure 6:
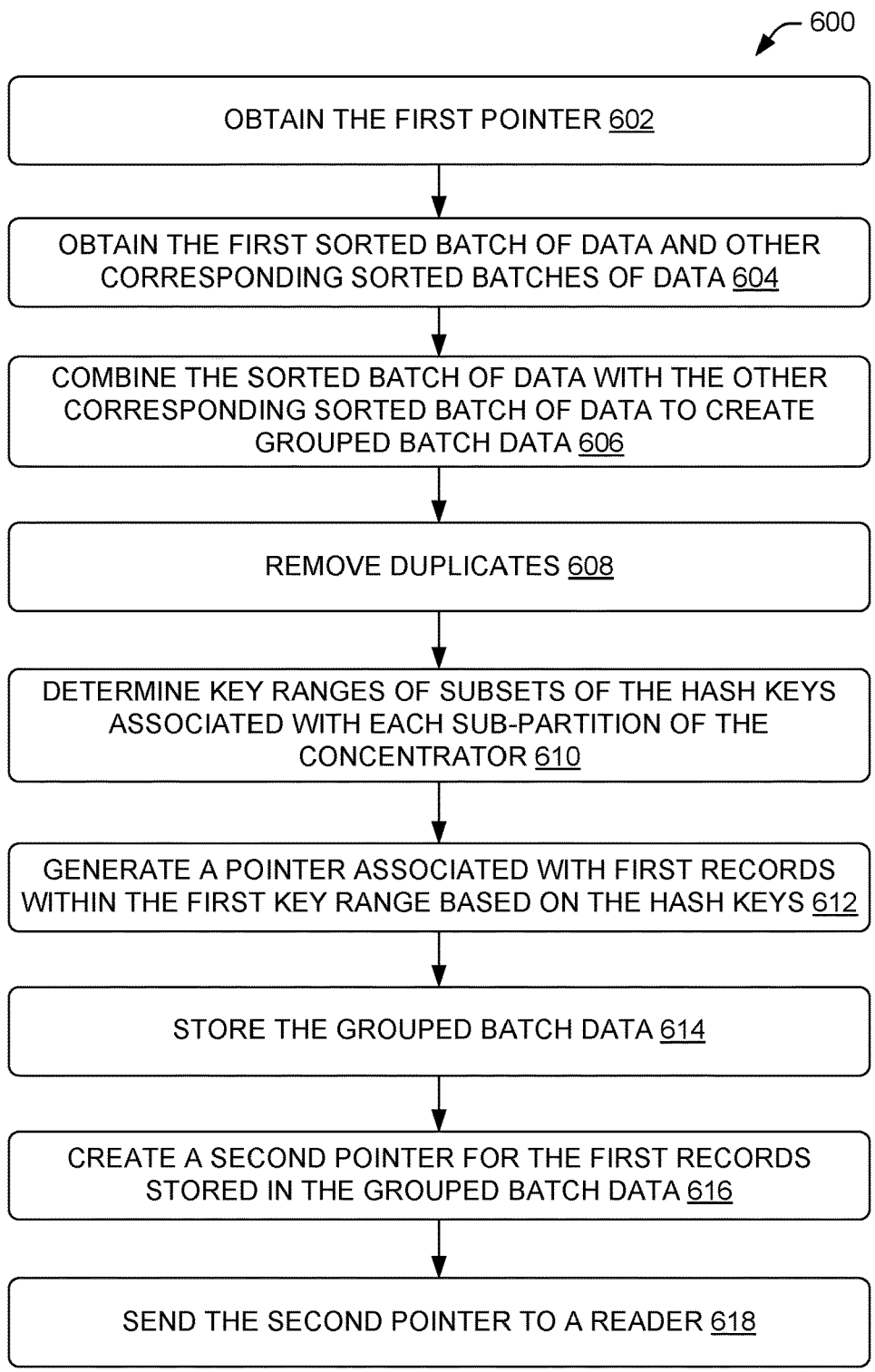
FIG. 6 is a flow diagram of an illustrative process performed by a concentrator to obtain batches of data and output groups of batched data.
Figure 7:
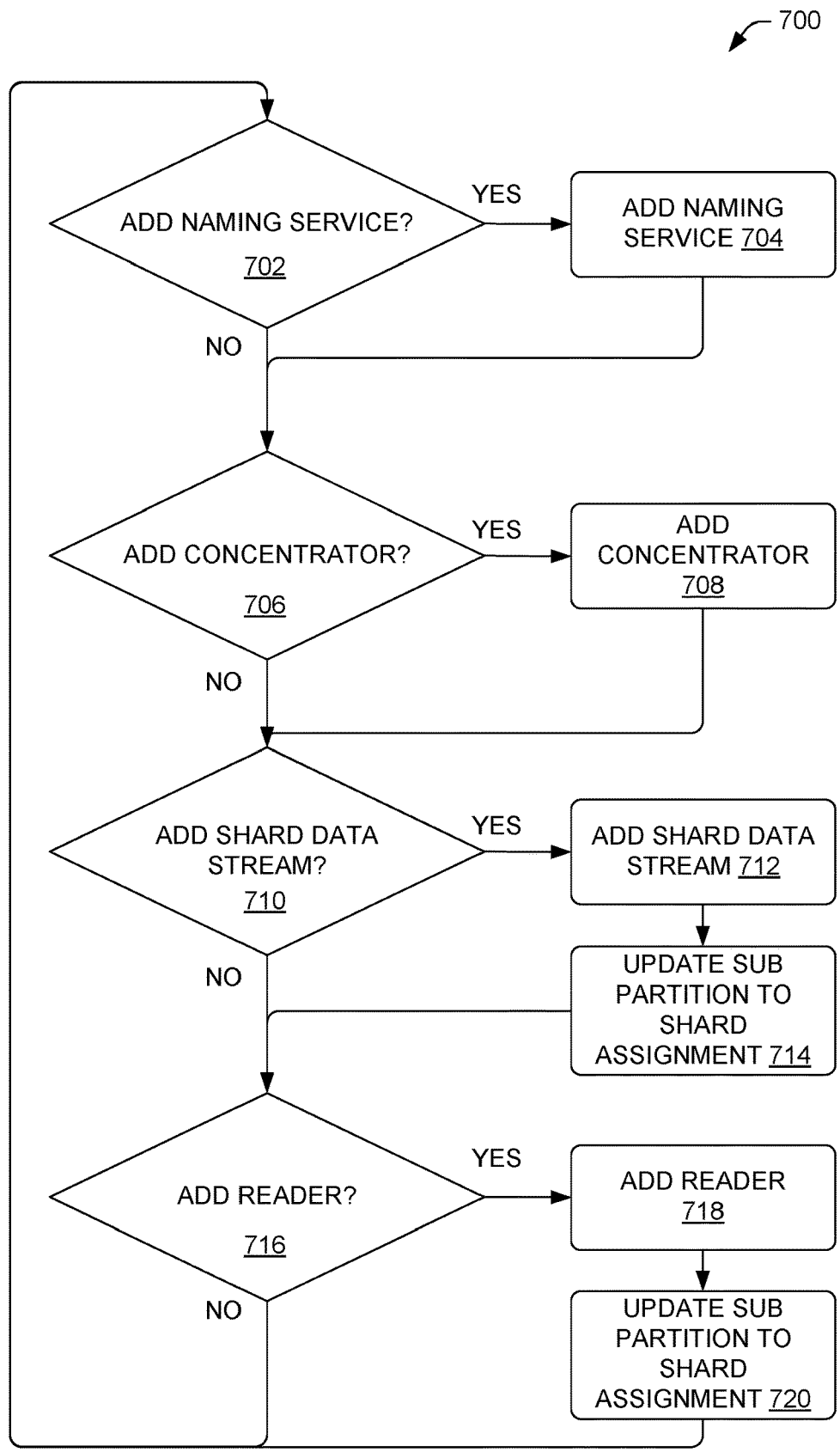
FIG. 7 is a flow diagram of an illustrative process to add one or more components to a system to assist with an increase ingestion of data.

FIGS. 5-7 are flow diagrams of illustrative processes that are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an illustrative process 500 performed by a naming service, such as one of the naming services 106 shown in FIG. 2 to process incoming data. The process 500 is described with reference to the systems 100, 200, and 400 described above, as well as the concentrator 300. Of course, the process 500 may be performed in other similar and/or different environments.

At 502, a naming service may obtain a record. The record may be selected based on a match of a metric name and/or other data. The naming service may identify certain specific information and create or obtain a record for that information when identified. For example, the naming service may receive incoming data from a data source, such as click stream data, search terms, data created by users, event data created by users or devices, and so forth.

At 504, the naming service may create a hash key for the record. The hash key may be a 32 bit unsigned integer of a metric name identified by the naming service. In some embodiment, the hash key may be created using less than 32 bits, but may later have bits added to the hash key for processing by the concentrator (e.g., added bits to right of hash key).

At 506, the naming service may create a sorted batch of data that includes the record from the operation 502 and the hash key from the operation 504, as well as other records and associated hash keys. The batch may include data received during a threshold amount of time, a threshold amount of data, or based on other criteria. The records in the batch of data may be sorted by the hash keys. The batch of data may be undifferentiated, but sorted.

At 508, the naming service may store the batch of data in a data storage device, such as the data storage device 204. For example, the naming service may write the batch of data to the data storage device.

At 510, the naming device may create a pointer to locate the batch of data stored by the data storage device. However, in some embodiments, the pointer may be created by the data storage device and provided to the naming service.

At 512, the naming service may send the pointer (e.g., the first pointer) to a concentrator to enable the concentrator to be notified about and access the batch of data from the data storage device. In some embodiments, the naming service may convey the pointer to a data stream to transmit the pointer to the concentrator. The data stream may be any type of data pipeline that provide data via a first-in, first-out conveyance of data to the concentrator.

FIG. 6 is a flow diagram of an illustrative process 600 performed by a concentrator, such as the concentrator 108 and/or 300 to obtain batches of data and output groups of batched data. The process 600 is described with reference to the systems 100, 200, and 400 described above, as well as the concentrator 300. Of course, the process 600 may be performed in other similar and/or different environments.

At 602, the concentrator may obtain the first pointers. For example, the concentrator may obtain the first pointers created by the naming service at the operation 510 in the process 500 shown in FIG. 5. The concentrator may receive or obtain the first pointer, and a plurality of other pointers via a data stream that coveys the pointers to the concentrator.

At 604, the concentrator may obtain a first sorted batch of data referenced by the first pointer. For example, the first pointer obtained at the operation 602 may include an address of the batch of data that is stored in a data storage device. In some embodiments, the pointer may include a key to enable access to the data. The pointer may include an encryption key or other security features.

At 606, the concentrator may combine the batch of data with at least another batch of data to create a sorted grouped batch data, which may be differentiated. For example, the concentrator may receive a plurality of pointers, determine which pointers reference related information, and then retrieve and combine the corresponding batches of data to create the grouped batch of data.

At 608, the concentrator may optionally remove duplicate records from the grouped batch of data or while creating the grouped batch of data, may omit adding duplicate data. However, removal of duplicate records may be performed at other stages of data processing in accordance with various embodiments.

At 610, the concentrator may determine key ranges of subsets of the hash keys associated with each sub-partition of the concentrator. As discussed with reference to FIG. 3, the concentrator may be sub-partitioned into a base-2 number of sub-partitions that each have an equally sized range of key values (each referred to as different "key ranges"). The key ranges each have lower and upper bounds for possible hash key values that can be included in the respective key ranges. An example, of the lower bounds and the upper bounds are shown in Table 1, discussed above with reference to FIG. 3.

At 612, the concentrator may generate a second pointer associated with the first records within a first key range. The first records will be sorted or otherwise placed in the first key range due to respective hash keys of the first records being within the lower and upper bounds of the first key range. Similarly, some records will be sorted or otherwise placed in a second key range, and so forth based on the lower and upper bounds of the key ranges and the respective hash keys of those records.

At 614, the concentrator may store the grouped batch of data. The concentrator may store the grouped batch of data in a data storage device, which may be a same or similar data storage device used to store the sorted batches of data by the naming services via the operation 508 of the process 500 described with reference to FIG. 5. In some embodiments, the concentrator may store the grouped batch of data based at least in part on the sub-partition (key space), and thus may store multiple files (e.g., one for each sub-partition, one for each shard data stream, etc.). In various embodiments, the concentrator may store a single file or set of data, which may be associated with different pointers that are directed to different data within the grouped batch of data.

At 616, the concentrator may create a second pointer to locate the grouped batch of data stored by the data storage device. However, in some embodiments, the second pointer may be created by the data storage device and provided to the concentrator.

At 618, the concentrator may send the second pointer to a respective shard data stream to enable a respective reader to be notified about and access the shard of records from the data storage device. In some embodiments, the concentrator may convey the second pointer to a shard data stream based on a map to transmit the pointer to the concentrator. The data stream may be any type of data pipeline that provide data via a first-in, first-out conveyance of data to the respective reader.

FIG. 7 is a flow diagram of an illustrative process 700 to add one or more components to a system to assist with an increase ingestion of data. The process 700 is described with reference to the systems 100, 200, and 400 described above, as well as the concentrator 300. Of course, the process 700 may be performed in other similar and/or different environments.

At 702, the system or an administrator may determine whether to add a naming service to the system. For example, when throughput of the system is slowed by processing by the naming services and/or the concentrator utilization drops below a threshold value, then a decision may be made to add a naming service. When a naming service is to be added (following the "yes" route from the decision block 702), then the process 700 may advance to an operation 704.

At 704, an additional naming service 402 may be added to create additional batches of data and corresponding pointers for conveyance to the concentrator (or another concentrator), via the data stream. The added naming service may identify different metric names or different data than the other naming services. However, in some embodiments, the naming service may perform the same or similar operations as an existing naming service, and may cooperatively work with another naming service. The naming service may be added without impacting the readers or the concentrator.

At 706, following the operation 704 or when no naming services are added (following the "no" route from the decision block 702), a decision whether to add another concentrator may be made by the system or an administrator. An additional concentrator may be added when throughput of the system is slowed by processing by the existing concentrator(s) and/or the concentrator utilization exceeds a threshold value. When a concentrator is to be added (following the "yes" route from the decision block 706), then the process 700 may advance to an operation 708.

At 708, an additional concentrator 406 may be added to perform similar functions as the concentrator 108. For example, multiple concentrators may be deployed to obtain pointers via the data stream (and/or possibly other data streams), and create the grouped batches of data described above. In some embodiments, multiple concentrators may operation in cooperation with one another. However, the concentrators may be configured to operate independent of one another, such as by processing data in different key spaces, for example. Different concentrators may provide data to different sharded data streams, or possibly to a shared or possibly overlapping set of the sharded data streams.

At 710, following the operation 708 or when no concentrators are added (following the "no" route from the decision block 706), a decision whether to add shard data streams may be made by the system or administrator. For example, shard data streams may be added when throughput by the concentrator 108 generates more data for distribution to the various readers 112. Thus, by adding more shard data streams, throughput maybe increased analogous to opening a valve in a pipeline. When shard data streams are to be added to the system (following the "yes" route from the decision block 710), then the process 700 may advance to an operation 712 to add shard data streams. In some embodiments, at 712, a new shard data stream may transport data previously transported by a different shard data stream, possibly to a seam or different reader.

At 714, an update to a mapping of sub-partitions (key spaces) to shards (e.g., shard data streams and/or readers) may be performed based on changes to the data streams. For example, as shown in FIG. 4, an additional shard data stream may be added to accommodate conveying a pointer to a different or new reader or to an existing reader. A mapping change of a mapping of the sub-partitions to shard data streams and/or a mapping of the shard data streams to the readers may be updated to accommodate increased throughput of data by the system. For example, when multiple sub-partitions cause pointers of records to be directed to a same shard data stream, those sub-partitions may be later configured to send pointers to different shard data streams, such as the additional shard data stream.

At 716, following the operation 714 or when no shard data streams are added (following the "no" route from the decision block 710), a decision whether to add another reader may be made by the system or an administrator.

An additional reader may be added to process data sets and/or store more data generated by the concentrator via the process described above. Additional readers may also be deployed for other reasons. When a reader is to be added (following the "yes" route from the decision block 716), then the process 700 may advance to an operation 718.

At 718, an additional reader and possibly other additional readers may be added to the application components in addition to the existing readers. The additional readers may read certain ones of the second pointers, and retrieve the corresponding records associated with certain ones of the second pointers. In some embodiments, the addition of the additional reader(s) may cause a change in the configuration or assignment of records to shard data streams to the readers. For example, when multiple shard data streams feed pointers to a same reader, the sharded data streams may later (after adding a new reader) be configured to convey pointers to different readers.

At 720, an update to a mapping of sub-partitions (key spaces) to shards (e.g., shard data streams and/or readers) may be performed based on changes to the readers. For example, as shown in FIG. 4, the first shard data stream 214(1) may be configured to convey pointers to the additional reader 410. A mapping change of a mapping of the sub-partitions to shard data streams and/or a mapping of the shard data streams to the readers may be updated to accommodate increased throughput of data by the system. For example, when multiple sub-partitions cause pointers of records to be directed to a same shard data stream, those sub-partitions may be later configured to send pointers to different shard data streams, such as the additional shard data stream. The additional shard data stream may convey pointers to the new reader, for example, which may increase throughput of the system.

Since the systems described herein do not generally share state information nor generally require any type of synchronization, any number of additional components may be added as long as the expansion capacity of the sub-partitions in not exceeded. Thus, the system cannot easily accommodate more sharded readers than sub-partitions.

When a reader is not to be added (following the "no" route from the decision block 710), then the process 700 may continue to the decision operation 702. In some embodiments, the process 700 may update the sub-partition to shard assignment via the operation 714 from time to time to increase throughput of the system and/or for other reasons.

Figure 8:
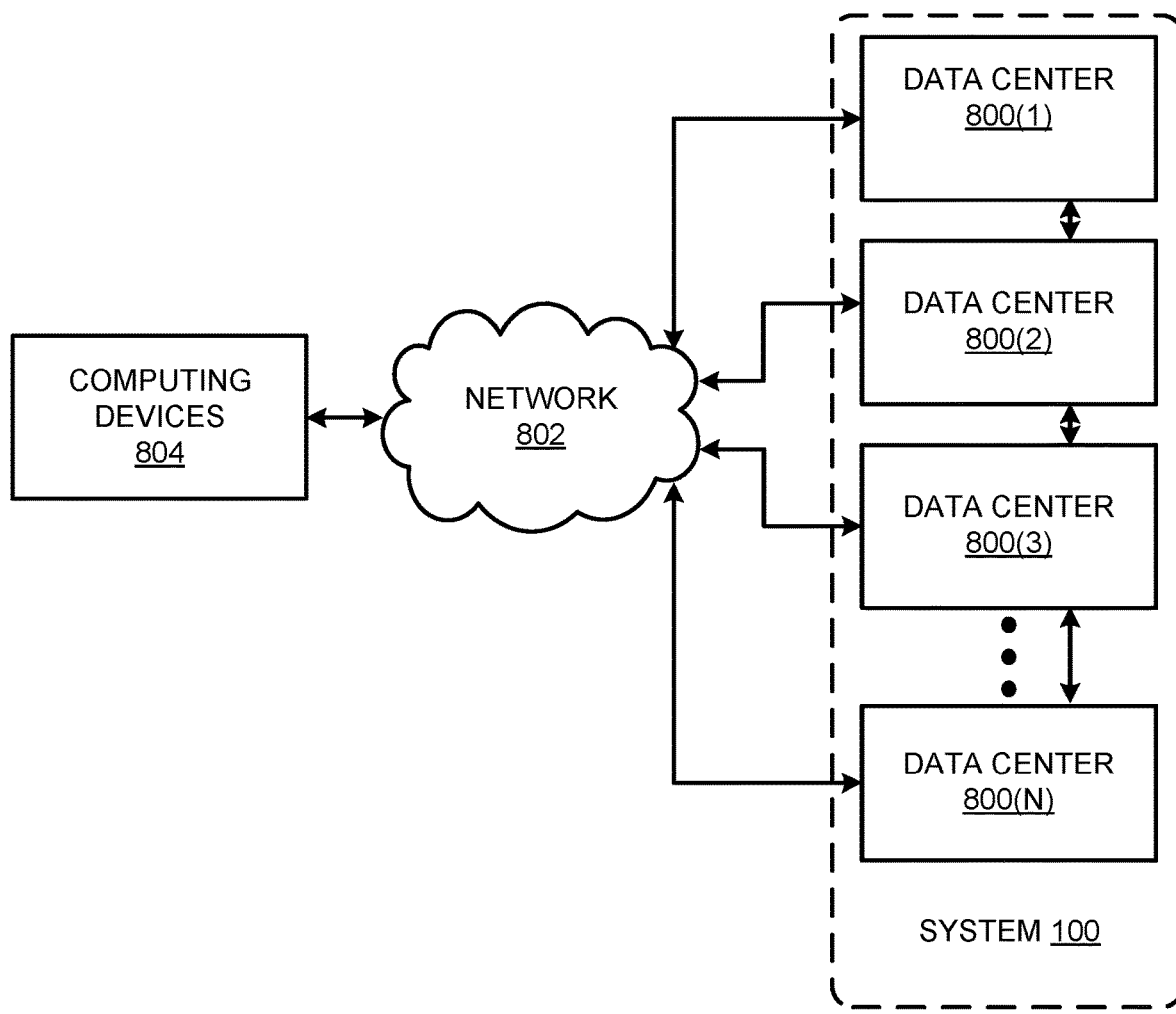
FIG. 8 is a system and network diagram that shows an illustrative operating environment that includes a system that can be configured to implement aspects of the functionality described herein.

FIG. 8 is a system and network diagram that shows an illustrative operating environment that includes the system 100 that can be configured to implement aspects of the functionality described herein. As discussed briefly above, the system 100 can execute network services, such as the data storage and data streaming, and/or provide computing resources, such as for the concentrator, on a permanent or an as-needed basis. Among other types of functionality, the computing resources provided by the system 100, or by a larger system of which the system 100 is a part, can be utilized to implement the various network services described herein. As also discussed above, the system 100 may be part of a larger system that provides the additional computing resources that include, without limitation, data storage resources, data processing resources, such as VM instances, networking resources, data communication resources, network services, and other types of resources.

Each type of computing resource provided by system 100, or by a larger system of which the system 100 is a part, can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The system 100, or a larger system of which the system 100 is a part, can also be configured to provide other types of computing resources not mentioned specifically herein.

The computing resources provided by system 100, or a larger system of which the system 100 is a part, are enabled in one implementation by one or more data centers 800(1), 800(2), 800(3), . . . , 800(N) (collectively 800). The data centers 800 are facilities utilized to house and operate computer systems and associated components. The data centers 800 typically include redundant and backup power, communications, cooling, and security systems. The data centers 800 can also be located in geographically disparate locations. One illustrative configuration for a data center 800 that can be utilized to implement the technologies disclosed herein will be described below with regard to FIG. 9.

The users of the system 100 can access the computing resources, such as analytics applications 108, provided by the system 100 over a network 802, which can be a wide area communication network ("WAN"), such as the Internet, an intranet or an Internet service provider ("ISP") network or a combination of such networks. For example, and without limitation, a computing device 804 operated by a user of the system 100 can be utilized to access the system 100 by way of the network 802. It should be appreciated that a local-area network ("LAN"), the Internet, or any other networking topology known in the art that connects the data centers 800 to remote customers and other users can be utilized. It should also be appreciated that combinations of such networks can also be utilized.

Figure 9:
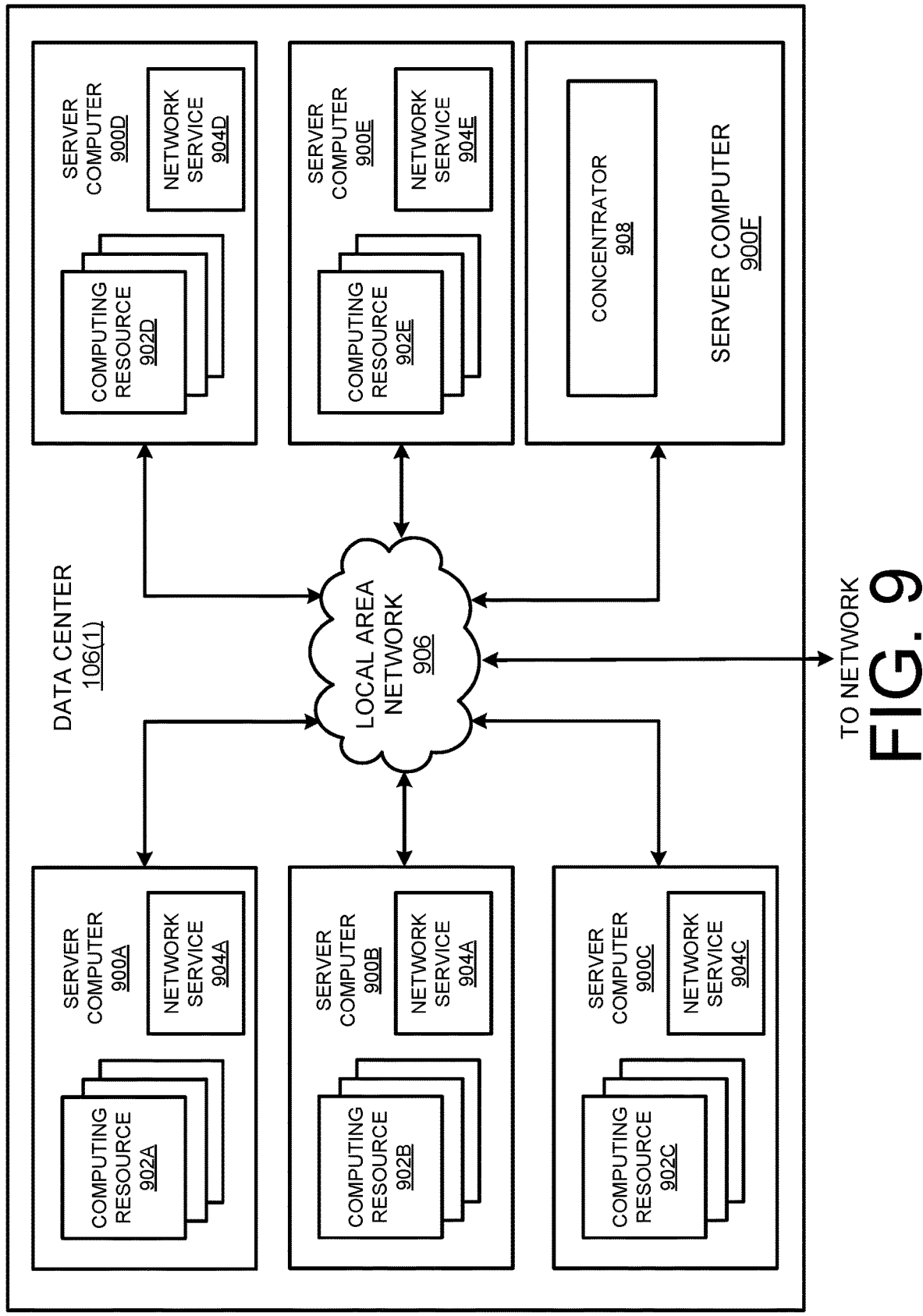
FIG. 9 is a computing system diagram illustrating a configuration for a data center that can be utilized to implement aspects of the technologies disclosed herein.

FIG. 9 is a computing system diagram that illustrates one configuration for a data center 800 that can be utilized to implement the concentrator 108 as described above in FIGS. 1-7, and/or any other network services disclosed herein, such as the naming services 106 and/or the readers 112. The example data center 800 shown in FIG. 9 includes several server computers 900A-900E (collectively 900) for providing the computing resources 902A-902E (collectively 902), respectively.

The server computers 900 can be standard tower, rackmount, or blade server computers configured appropriately for providing the various computing resources described herein (illustrated in FIG. 9 as the computing resources 902A-902E). As mentioned above, the computing resources 902 provided by the system 100, or a larger system of which the system 100 is a part, can include, without limitation, analytics applications 108, data storage resources, data processing resources such as VM instances or hardware computing systems, database resources, networking resources, and others. Some of the servers 900 can also be configured to execute network services 904A-904E (collectively 904) capable of instantiating, providing and/or managing the computing resources 902, some of which are described in detail herein.

The data center 800 shown in FIG. 9 also includes a server computer 900F that can execute some or all of the software components described above. For example, and without limitation, the server computer 900F can be configured to execute the data analytics service 106. The server computer 900F can also be configured to execute other components and/or to store data for providing some or all of the functionality described herein. In this regard, it should be appreciated that components or different instances of the data analytics service 106 can execute on many other physical or virtual servers in the data centers 800 in various configurations.

In the example data center 800 shown in FIG. 9, an appropriate LAN 906 is also utilized to interconnect the server computers 900A-900F. The LAN 906 is also connected to the network 802 illustrated in FIG. 8. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 800(1)-(N), between each of the server computers 900A-900F in each data center 800, and, potentially, between computing resources 902 in each of the data centers 800. It should be appreciated that the configuration of the data center 800 described with reference to FIG. 9 is merely illustrative and that other implementations can be utilized.

Figure 10:
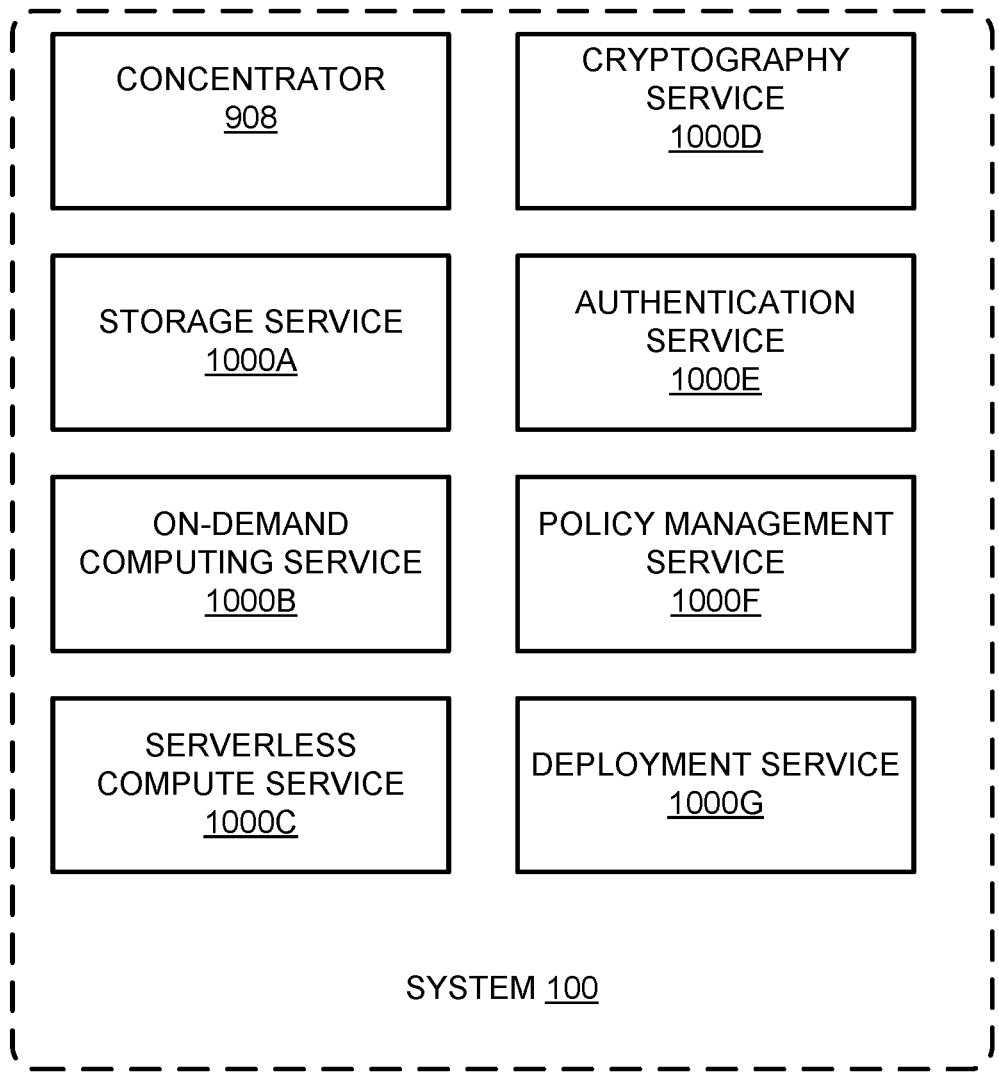
FIG. 10 is a network services diagram that shows aspects of several services that can be provided by and utilized within a system, or a larger system of which the system is a part, which is configured to implement the various technologies disclosed herein.

FIG. 10 is a network services diagram that shows aspects of several services that can be provided by and utilized within a system 100, or a larger system of which the system 100 is a part, which is configured to implement the various technologies disclosed herein. In particular, and as discussed above, the system 100, or a larger system of which the system 100 is a part, can provide a variety of network services to customers and other users including, but not limited to, the data analytics service 106, a storage service 1000A, an on-demand computing service 1000B, a serverless compute service 1000C, a cryptography service 1000D, an authentication service 1000E, a policy management service 1000F, and a deployment service 1000G. The system 100, or a larger system of which the system 100 is a part, can also provide other types of network services, some of which are described below.

It is also noted that not all configurations described include the network services shown in FIG. 10 and that additional network services can be provided in addition to, or as an alternative to, the services explicitly described herein. Each of the services shown in FIG. 10 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 10 will now be provided.

The storage service 1000A can be a network-based storage service that stores data obtained from customers of the system 100, or a larger system of which the system 100 is a part. The data stored by the storage service 1000A can be obtained from computing devices of customers.

The on-demand computing service 1000B can be a collection of computing resources configured to instantiate VM instances and to provide other types of computing resources 902 on demand. For example, a user of the system 100, or a larger system of which the system 100 is a part, can interact with the on-demand computing service 1000B (via appropriately configured and authenticated API calls, for example) to provision and operate VM instances that are instantiated on physical computing devices hosted and operated by the system 100, or a larger system of which the system 100 is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 1000B is shown in FIG. 10, any other computer system or computer system service can be utilized in the system 100, or a larger system of which the system 100 is a part, to implement the functionality disclosed herein, such as a computer system or computer system service that does not employ virtualization and instead provisions computing resources on dedicated or shared computers/servers and/or other physical devices.

The serverless compute service 1000C is a network service that allows users to execute code (which might be referred to herein as a "function") without provisioning or managing server computers in the system 100, or a larger system of which the system 100 is a part. Rather, the serverless compute service 1000C can automatically run code in response to the occurrence of events. The code that is executed can be stored by the storage service 1000A or in another network accessible location.

In this regard, it is to be appreciated that the term "serverless compute service" as used herein is not intended to infer that servers are not utilized to execute the program code, but rather that the serverless compute service 1000C enables code to be executed without requiring a user to provision or manage server computers. The serverless compute service 1000C executes program code only when needed, and only utilizes the resources necessary to execute the code. In some configurations, the user or entity requesting execution of the code might be charged only for the amount of time required for each execution of their program code.

The system 100, or a larger system of which the system 100 is a part, can also include a cryptography service 1000D. The cryptography service 1000D can utilize storage services of the system 100, or a larger system of which the system 100 is a part, such as the storage service 1000A, to store encryption keys in encrypted form, whereby the keys can be usable to decrypt user keys accessible only to particular devices of the cryptography service 1000D. The cryptography service 1000D can also provide other types of functionality not specifically mentioned herein.

The system 100, or a larger system of which the system 100 is a part, in various configurations, also includes an authentication service 1000E and a policy management service 1000F. The authentication service 1000E, in one example, is a computer system (i.e., collection of computing resources 902) configured to perform operations involved in authentication of users or customers. For instance, one of the services shown in FIG. 10 can provide information from a user or customer to the authentication service 1000E to receive information in return that indicates whether or not the requests submitted by the user or the customer are authentic.

The policy management service 1000F, in one example, is a network service configured to manage policies on behalf of users or customers of the system 100, or a larger system of which the system 100 is a part. The policy management service 1000F can include an interface (e.g. API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The system 100, or a larger system of which the system 100 is a part, can additionally maintain other network services based, at least in part, on the needs of its customers. For instance, the system 100, or a larger system of which the system 100 is a part, can maintain a deployment service 1000G for deploying program code in some configurations. The deployment service 1000G provides functionality for deploying program code, such as to virtual or physical hosts provided by the on-demand computing service 1000B. Other services include, but are not limited to, database services, object-level archival data storage services, and services that manage, monitor, interact with, or support other services. The system 100, or a larger system of which the system 100 is a part, can also be configured with other network services not specifically mentioned herein in other configurations.

Figure 11:
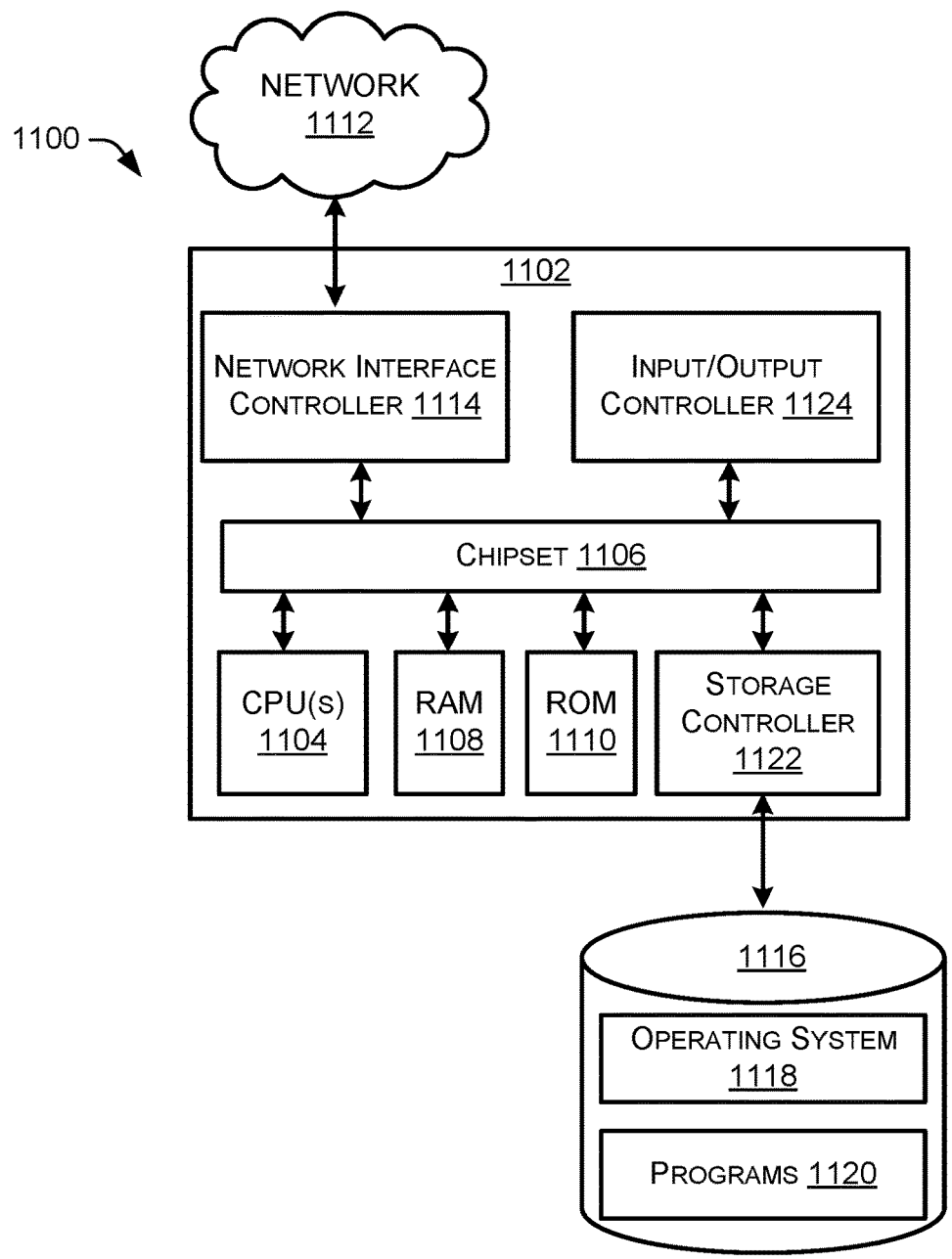
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. The computer 1100 may represent architecture for a naming service, a concentrator, a reader, and/or other devices described herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1112. The chipset 1106 can include functionality for providing network connectivity through a NIC 1114, such as a gigabit Ethernet adapter. The NIC 1114 is capable of connecting the computer 1100 to other computing devices over the network 1112. It should be appreciated that multiple NICs 1114 can be present in the computer 1100, connecting the computer to other types of networks and remote computer systems.

The computer 1100 can be connected to a mass storage device 1116 that provides non-volatile storage for the computer. The mass storage device 1116 can store an operating system 1118, programs 1120, and data, which have been described in greater detail herein. The mass storage device 1116 can be connected to the computer 1100 through a storage controller 1122 connected to the chipset 1106. The mass storage device 1116 can consist of one or more physical storage units. The storage controller 1122 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the mass storage device 1116 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1116 is characterized as primary or secondary storage, and the like.

For example, the computer 1100 can store information to the mass storage device 1116 by issuing instructions through the storage controller 1122 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1116 by detecting the physical states or characteristics of one or more particular locations within the physical storage units.

In addition to the mass storage device 1116 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1116 can store an operating system 1118 utilized to control the operation of the computer 1100. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1116 can store other system or application programs and data utilized by the computer 1100.

In one configuration, the mass storage device 1116 or other computer-readable storage media is encoded with computer-executable instructions which, when loaded into the computer 1100, transform the computer from a general-purpose computing system into a special-purpose computer capable of implementing the configurations described herein. These computer-executable instructions transform the computer 1100 by specifying how the CPUs 1104 transition between states, as described above. According to one configuration, the computer 1100 has access to computer-readable storage media storing computer-executable instructions which, when executed by the computer 1100, perform the various processes described above. The computer 1100 can also include computer-readable storage media for performing any of the other computer-implemented operations described herein.

The computer 1100 can also include one or more input/output controllers 1124 for receiving and processing input from a number of input devices, such as a keyboard, a mouse, a touchpad, a touch screen, an electronic stylus, or other type of input device. Similarly, an input/output controller 1124 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or can utilize an architecture completely different than that shown in FIG. 11.

Based on the foregoing, it should be appreciated that technologies for providing a network service capable of identifying infrequently accessed data from a request stream have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method, comprising:
    obtaining a first pointer;
    obtaining a first sorted batch of data based at least in part on information associated with the first pointer, the first sorted batch of data including records sorted by hash keys;
    combining the first sorted batch of data with at least one other corresponding sorted batch of data to create grouped batch data;
    determining a first key range of a subset of the hash keys based at least in part on a predetermined sub-partition, the first key range associated with a predefined data shard;
    determining first records of the records included in the first sorted batch of data, the first records being included within the first key range of the subset of the hash keys;
    storing at least the first records as grouped batch data;
    creating a second pointer associated with the first records that are included in the first key range of the subset of the hash keys used to sort the first sorted batch of data; and
    sending the second pointer to an application of a plurality of applications configured to read the first records.

2. The computer-implemented method as recited in claim 1, further comprising:
    generating a sorted batch of data associated with one or more metric names;
    storing the sorted batch of data based at least in part on hash keys of the one or more metric names; and
    creating the first pointer for the sorted batch of data.

3. The computer-implemented method as recited in claim 1, wherein the first records include the predefined data shard to be read by the application.

4. The computer-implemented method as recited in claim 1, further comprising:
    creating a third pointer associated with second records included within a second key range having a different range of the hash keys than the first key range, and
    sending the third pointer to the application configured to read the first records and the second records;
    wherein the second pointer is transported to the application using a first shard data stream and the third pointer is conveyed to the application using a second shard data stream, and
    wherein the application to which the second pointer and the third pointer are conveyed is a same application.

5. The computer-implemented method as recited in claim 1, further comprising removing at least some duplicate data prior to storing the grouped batch data.

6. The computer-implemented method as recited in claim 1, wherein a first quantity of key ranges of sub-partitions is greater than a second quantity of a plurality of shard data streams used to transport the second pointer and other pointers to the plurality of applications.

7. The computer-implemented method as recited in claim 1, wherein the hash key is a 32-bit unsigned integer and the first key range includes hash keys between 0 and $2^{22}$.

8. The computer-implemented method as recited in claim 1, wherein the first key range is $2^n$, where n is an integer greater than or equal to 10.

9. A system configured to route sharded data to an application of a plurality of applications, the system comprising:
    a concentrator including computer-executable instructions that, when executed, operate to:
        obtain a first pointer generated by a naming service;
        retrieve a sorted batch of data from a storage service based at least in part on the first pointer, the data including records sorted by hash keys;
        combine the sorted batch of data with at least one other sorted batch of data to create grouped batch data;
        send the grouped batch data to the storage service for at least temporary storage;
        sub-partition the grouped batch data into a plurality of groups each associated with a different key range that is a predetermined division of possible hash keys, wherein a first number of key ranges of the hash keys is greater than a second number of the plurality of applications; and
        send second pointers that locate at least first records of the grouped batch data, stored by the storage service, to a first shard data stream of a plurality of shard data streams, the second pointers being sent based at least in part on the first records being within a first key range of the key ranges of the hash keys by which the records of the sorted batch of data are sorted, the first shard data stream to convey the first records to an application of the plurality of applications.

10. The system as recited in claim 9, wherein the sorted batch of data is generated by a first naming service, and wherein the concentrator receives a second sorted batch of data generated by a second, different naming service, and wherein the at least one other sorted batch of data includes the second sorted batch of data.

11. The system as recited in claim 9, wherein the concentrator further includes computer-executable instructions to remove at least some duplicate data from the grouped batch data prior to sending the grouped batch data to the storage service.

12. The system as recited in claim 9, wherein the concentrator is a first concentrator, and further comprising a second concentrator to send additional pointers that locate at least additional records, stored by the storage service, to the first shard data stream of the plurality of shard data streams based at least in part on additional records being within the first key range of the key ranges.

13. The system as recited in claim 9, wherein the concentrator further includes computer-executable instructions to:
send third pointers that locate at least second records of the grouped batch data, stored by the storage service, to a second shard data stream of the plurality of shard data streams based at least in part on the second records being within a second key range of the key ranges, the second shard data stream to convey the second records to a different application of the plurality of applications.

14. The system as recited in claim 9, wherein the grouped batch data is segmented in the storage service based at least in part on the key ranges.

15. The system as recited in claim 9, wherein the application includes an index updater that receives the first records created by the naming service.

16. A system configured to route data shards to a plurality of applications, the system comprising:
a naming service to:
identify a metric name from data provided by an incoming data source;
generate a hash key for the metric name to create a record; and
generate a sorted batch of data that includes the record and other records, the record and the other records each including corresponding hash keys of a plurality of hash keys;
a storage service to at least temporarily store the sorted batch of data;
a data stream to transport a first pointer that locates the sorted batch of data stored by the storage service;
a concentrator in communication with the data stream to:
obtain the first pointer via the data stream;
retrieve the sorted batch of data;
combine the sorted batch of data with at least one other sorted batch of data based at least in part on the corresponding hash keys to create grouped batch data;
send the grouped batch data to the storage service for at least temporary storage;
sort records in the grouped batch data into a plurality of sub-partitions based at least in part on the corresponding hash keys in the record and the other records, each sub-partition associated with a different key range that is a predetermined division of possible hash keys of the plurality of hash keys, wherein a first number of key ranges into which the records in the grouped batch data are sorted is greater than a second number of the plurality of applications to which the data shards are routed; and
send, to a first shard data stream of a plurality of shard data streams, a second pointer and a third pointer that locate at least first records of the grouped batch data, stored by the storage service, based at least in part on the first records being within a first key range of a subset of the plurality of hash keys associated with the sorted batch of data located via the first pointer;
the first shard data stream to transport the second pointer and the third pointer to a first application of the plurality of applications.

17. The system as recited in claim 16, further comprising an additional naming service to increase throughput of processing of additional sorted batches of data for processing by the concentrator, wherein the additional naming service is independent from adding at least one of an additional concentrator or an additional application of the plurality of applications.

18. The system as recited in claim 16, further comprising an additional concentrator to increase throughput of processing of additional grouped batches of data for dissemination via the plurality of shard data streams.

19. The system as recited in claim 16, further comprising an additional application to read other records associated with another data shard, wherein adding of the additional application is independent from adding at least one of an additional naming service or an additional concentrator.

20. The system as recited in claim 16, wherein the first application to which the second pointer is transported is a same application as the first application to which the third pointer is transported.

\* \* \* \* \*